United States Patent

[11] 3,634,633

[72] Inventor John Joseph Driscoll
Wheaton, Ill.
[21] Appl. No. 36,071
[22] Filed May 11, 1970
[45] Patented Jan. 11, 1972
[73] Assignee Bell Telephone Laboratories, Incorporated
Murray Hill, N.J.

[54] PRECESSED PULSE TEST ARRANGEMENT
8 Claims, 6 Drawing Figs.

[52] U.S. Cl. 179/175.2 R
[51] Int. Cl. H04m 3/22
[50] Field of Search 179/175.2 R, 175.2 C

*Primary Examiner*—Kathleen H. Claffy
*Assistant Examiner*—Douglas Wolms
*Attorneys*—R. J. Guenther and R. B. Ardis

ABSTRACT: A test arrangement for testing dial pulse receivers in a telephone switching system wherein such receivers are interrogated by means of scanning pulses occurring at a fixed scanning rate is disclosed. Test pulses synchronized to the scanning pulses are transmitted to a dial pulse receiver and are precessed (advanced) in time with respect to the occurrence of the scanning pulses. A defective dial pulse receiver is detected by comparing the number of test pulses transmitted to a dial pulse receiver during a fixed time interval with the number of pulses received therefrom during the same time interval. The test pulses are made to resemble dial pulses received from a subscriber line by means of distortion circuits which simulate various subscriber loop conditions.

INVENTOR
J. J. DRISCOLL
BY John C Albert
ATTORNEY 12.7 PPS, 70% BREAK 20.5 PPS, 69% BREAK

PRECESSED PULSE TEST ARRANGEMENT

CROSS-REFERENCE TO RELATED APPLICATIONS

A telephone switching system in which this invention may be practiced advantageously is disclosed in greater detail in the copending U.S. Pat. application of T. M. Quinn and F. S. Vigilante, Ser. No. 868,196, entitled "Shared Memory Data Processing System", filed Oct. 21, 1969 and assigned to the assignee of this invention.

BACKGROUND OF THE INVENTION

1. Field of the Invention

This invention relates to an arrangement for testing indicator circuits in a system in which such circuits are interrogated at a fixed interrogation rate. More specifically, it relates to an arrangement for testing telephone dial pulse receiver circuits in a telephone switching system wherein such circuits are scanned at a fixed scanning rate.

2. Description of the Prior Art

In systems wherein the interrogation of indicator circuits (e.g. dial pulse receivers) may be controlled to occur at any desired time, such circuits may be tested by applying input information to a selected circuit and interrogating the circuit a predetermined period of time thereafter to determine whether an expected output pulse is produced. In one electronic telephone switching system wherein the scanning of the dial pulse receivers is controlled by program, a dial pulse receiver is tested by the application of a simulated dial pulse to a selected receiver and by scanning the receiver within a specified time period after application of the dial pulse. The results of the scanning are then used to determine whether an output pulse is produced within an acceptable period of time. The simulated dial pulses are generated by means of distortion circuits which simulate various subscriber loop conditions.

In a system wherein indicator circuits are interrogated at a fixed repetition rate as, for example, under control of wired logic, the occurrence of interrogation pulses cannot be controlled with respect to the application of test pulses. Under normal operating conditions signals are applied to the indicator circuits in random fashion. However, random application of test pulses to the indicator circuits does not provide a solution to the problem of testing the indicator circuits since it is intuitively apparent that a very large number of pulses would have to be applied in order to assure that a tested pulse receiver is operating within prescribed limits.

SUMMARY OF THE INVENTION

In accordance with this invention, testing of indicator circuits in a system wherein such circuits are interrogated at a fixed rate is accomplished by the application of test pulses which advance in time with respect to the successive times of interrogation. Such advancing in terms processing herein, interrogation of the indicator circuits is controlled by means of interrogate pulses which have a fixed repetition rate and which are generated from clock pulses of a predetermined frequency. The test pulses which are applied to the indicator circuits are generated from clock pulses having the same predetermined frequency. The repetition period of the test pulses is chosen to be a nonintegral multiple of the integrate pulses, thus producing test pulses which precess with respect to the interrogate pulses. This controlled precession effectively moves the test pulses past the interrogate pulses in the time domain in a controlled manner, thereby allowing an indicator circuit to be completely tested by the application of a relatively small number of test pulses. The number of pulses required to completed test an indicator circuit is a function of the amount of precession introduced with each test pulse which in turn is determined by the desired accuracy of the test. The test pulses are made to closely resemble the actual pulses encountered during normal operation, by means of distortion circuits which simulate various conditions encountered during normal operation.

General Description

Figure 1:
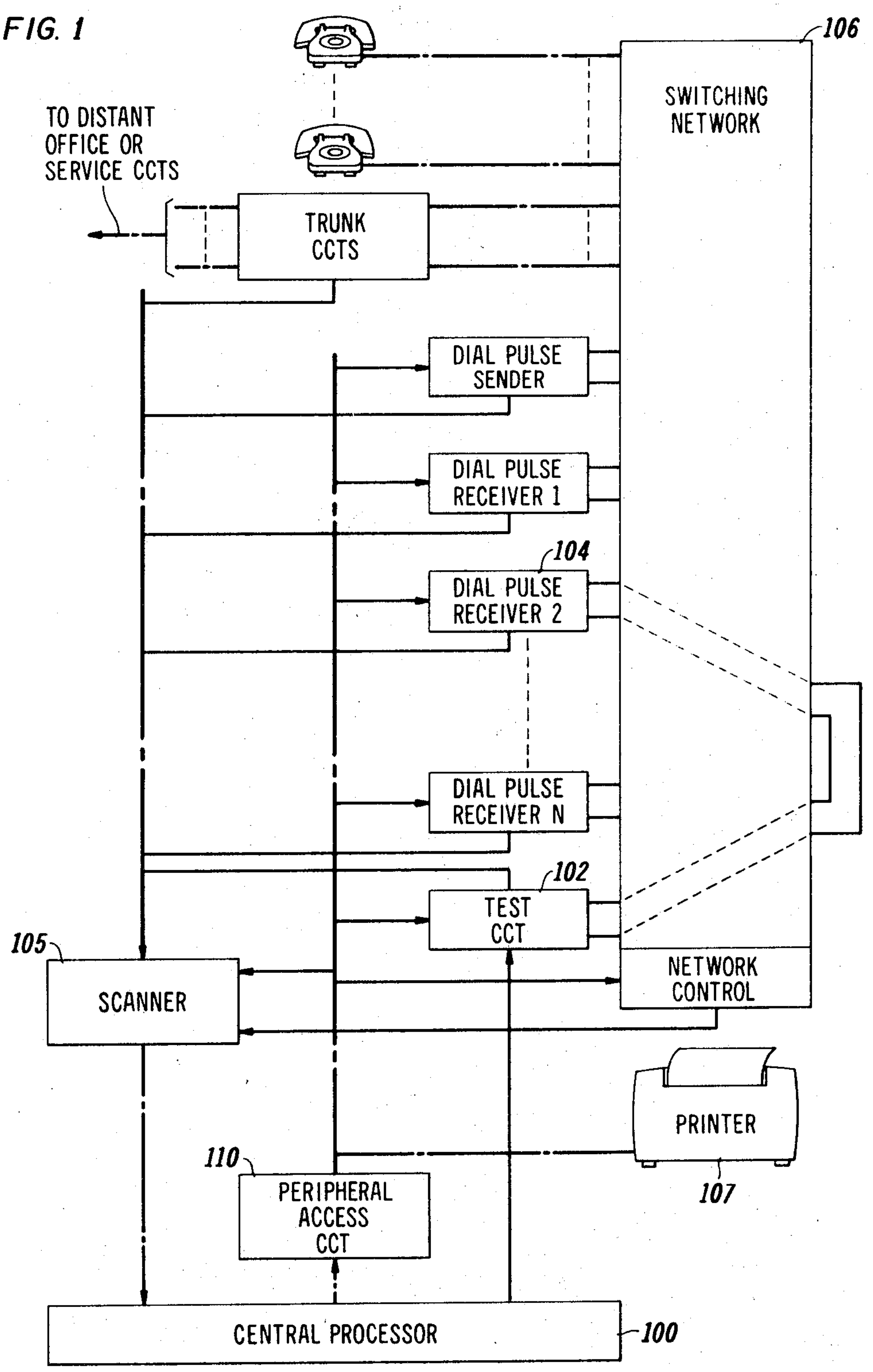
FIG. 1 is a block diagram representation of a telephone switching system.

In the illustrative embodiment of this invention, testing of dial pulse receivers, in a telephone switching system wherein such receivers are scanned at a fixed rate, is accomplished by the application of a plurality of pulses synchronized to the scanning and precessing with respect to the scanning. The illustrative telephone system comprises a plurality of dial pulse receivers, a test circuit which generates simulated dial pulses and which is connectable to the receivers by means of a switching network, a scanner for interrogating the receivers, and a wired logic processor for controlling the scanner. The receivers each comprise a pulse correction circuit which is responsive to dial pulse signals occurring at the receivers' input terminals to reproduce a corrected dial pulse at its output terminals. The wired logic processor comprises a timing circuit which among others produces 1.25 millisecond timing pulses. The wired logic processor responds to these pulses to scan each dial pulse receiver approximately once every 10 milliseconds. The test circuit responds to the same 1.25 millisecond pulses to generate simulated dial pulses which approximate the 10 (p.p.s.) pulses per second and 20 p.p.s. dial pulse rates often encountered in the operation of a telephone system. The simulated dial pulses actually generated for the test purposes are 12.7 p.p.s. dial pulses and 20.5 p.p.s. dial pulses. The 12.7 p.p.s. dial pulses have a repetition period of 78.75 milliseconds; the 20.5 p.p.s. dial pulses have a repetition period of 48,75 milliseconds. Since the repetition period of the scan pulses is approximately 10 milliseconds, a precession is introduced by each simulated dial pulse which is equal to 1.25 milliseconds or one-eighth of a scan period. This value is derived by subtracting the repetition period of the simulated pulses from the nearest integral number of scan pulses (i.e., 80—78.75=1.25 milliseconds; 50—48.75=1.25 milliseconds).

Figure 5:
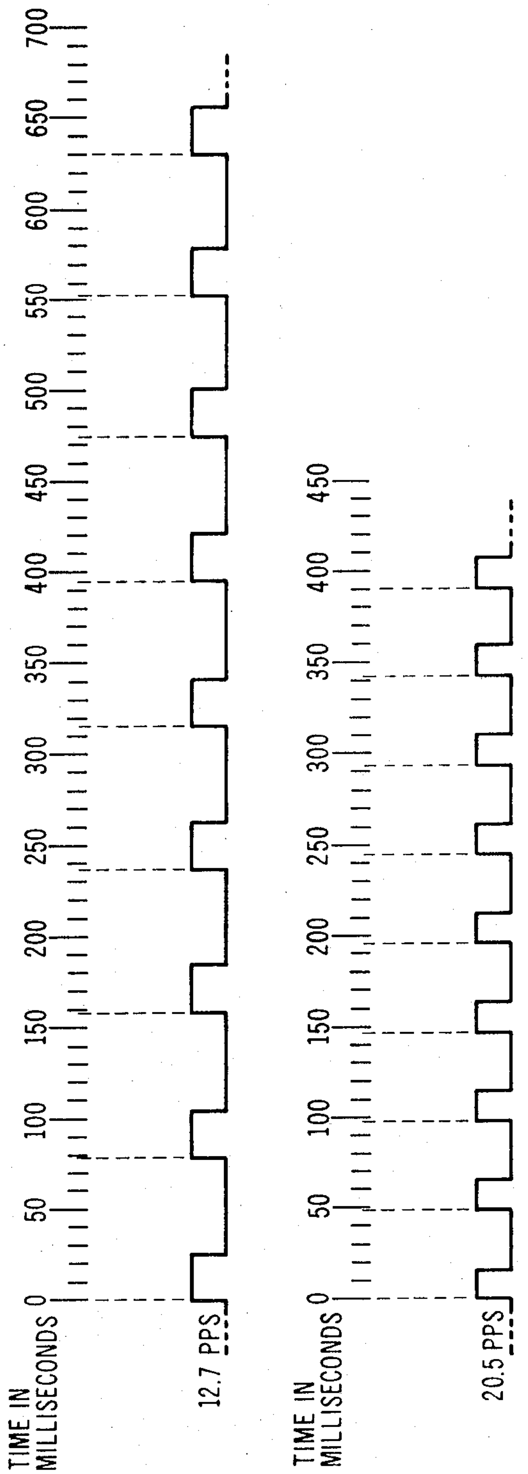
FIG. 5 is a timing diagram which shows the precession of undistorted dial pulses with respect to scan pulses.

The dial pulse receivers are tested by the successive application of several test pulses. When, as in this illustrative system, a precession of one-eighth of a scan period is used, a dial pulse receive can be completely tested by the application of eight successive test pulses. FIG. 5 shows the precession of the simulated dial pulses with respect to the scan pulses. The dial pulses are shown in their undistorted form but serve to illustrate the principle since the distortion introduced by the test circuit is consistently the same for each successive test pulse. It can be seen from FIG. 5 that the precession pattern repeats itself after the application of eight test pulses. The ninth test pulse occurs at the same point in time relative to the scan pulses as did the first dial pulse. Consequently, the 10th and subsequent pulses will occur at the same relative point in time as the second and subsequent pulses.

In addition to circuits for generating dial pulses, the test circuit also comprises circuits for distorting dial pulses in a determined manner such that the resulting dial pulse resembles the dial pulses normally received from a subscriber line. The distortion circuitry is so designed as to produce pulses which are at least 11 milliseconds wide at a fixed threshold level in order to assure detection in properly operating dial pulse receivers which are scanned at the 10 millisecond scan rate.

It is clear that output pulses of a dial pulse receiver which are greater than one scan period (i.e., 10 milliseconds) in duration will be detected by scanning at the 10-millisecond rate. Consequently, dial pulse receivers producing such pulses will be considered to be operating properly. As discussed later herein, the accuracy of testing using precessing test pulses is a function of the amount of precession. By the use of test pulses having a ⅛-scan-period precession, all output pulses which are less than seven-eighths of a scan period in duration will not be detected; however, output pulses having a duration of between seven-eighths of a scan period and one scan period may or may not be detected. Thus, there exists some degree of uncertainty in the test results which is not deemed to be detrimental in the particular application disclosed herein. Where a greater accuracy is desired, test pulses having a smaller precession may be used. For example, if a precession of one-tenth of a scan period were used, there would be uncertainty only as to pulses having a duration of between 0.9 and one times the scan period.

The relationship between precession and accuracy of test may be best explained by means of an example. Assuming that the value of the precession were chosen to be one-half of a scan period, it follows that each applied test pulse would be displaced from the preceding test pulse by one-half of the scan period with respect to the nearest scan pulse. As a consequence, an output pulse having a width slightly greater than one-half of a scan period might occur in such a relative time position as to be detected consistently. For example, if the leading edge of the first output pulse were to occur just prior to the occurrence of a scan pulse, the first output pulse would be detected. The leading edge of the second output pulse would then appear approximately half way between two scan pulses and, because its width is greater than one-half of a scan period, it would be detected by a scan pulse occurring just prior to the trailing edge of the output pulse. The third output pulse would again be detected as its leading edge would occur in the same relative position as the first output pulse. It follows that an output pulse having a width slightly greater than one-half of a scan period might be detected consistently, indicating that the associated dial pulse receiver is operating satisfactorily. It also follows that any output pulse having a duration less than one-half of a scan period could not be consistently detected. By similar reasoning, it can be seen that if precession of one-fourth of a scan period is used, any pulse slightly greater than three-fourths of a scan period might be detected consistently. It follows from the above that when each successive output pulse is precessed by one-eighth of a scan period, any output pulse having a duration slightly greater than seven-eighths of a scan period may be detected consistently and any output pulse less than that duration will not be detected consistently.

DETAILED DESCRIPTION

Dial Pulse Receiving

The receiving of dial pulses in this illustrative system will be discussed first, with respect to FIGS. 1 and 2. The specific operations of the system are set out in greater detail in the above-mentioned copending application of T. M. Quinn and F. S. Vigilante. As shown in FIG. 1, the illustrative telephone system comprises a plurality of dial pulse receivers and a scanner arrangement. The dial pulse receivers and the scanner arrangement are of the type discussed in The Bell System Technical Journal, Volume XLIII, Number 5, Part 2, Sept. 1964. The dial pulse receivers may be selectively enabled and connected to subscriber lines by means of the Switching Network 106. Signals for controlling the receivers and the network are generated by the Central Processor 100 and transmitted via the Peripheral Access Circuit 110. The Scanner 105 comprises a plurality of scanner rows each comprising 16 bits wherein each bit of a row is connected to a scan point of the system. The output terminals of each of the dial pulse receivers comprises one of such scan points. The Scanner 105 is responsive to scanner control signals to interrogate a selected scanner row and to transmit the corresponding information to the Central Processor 100.

Figure 2:
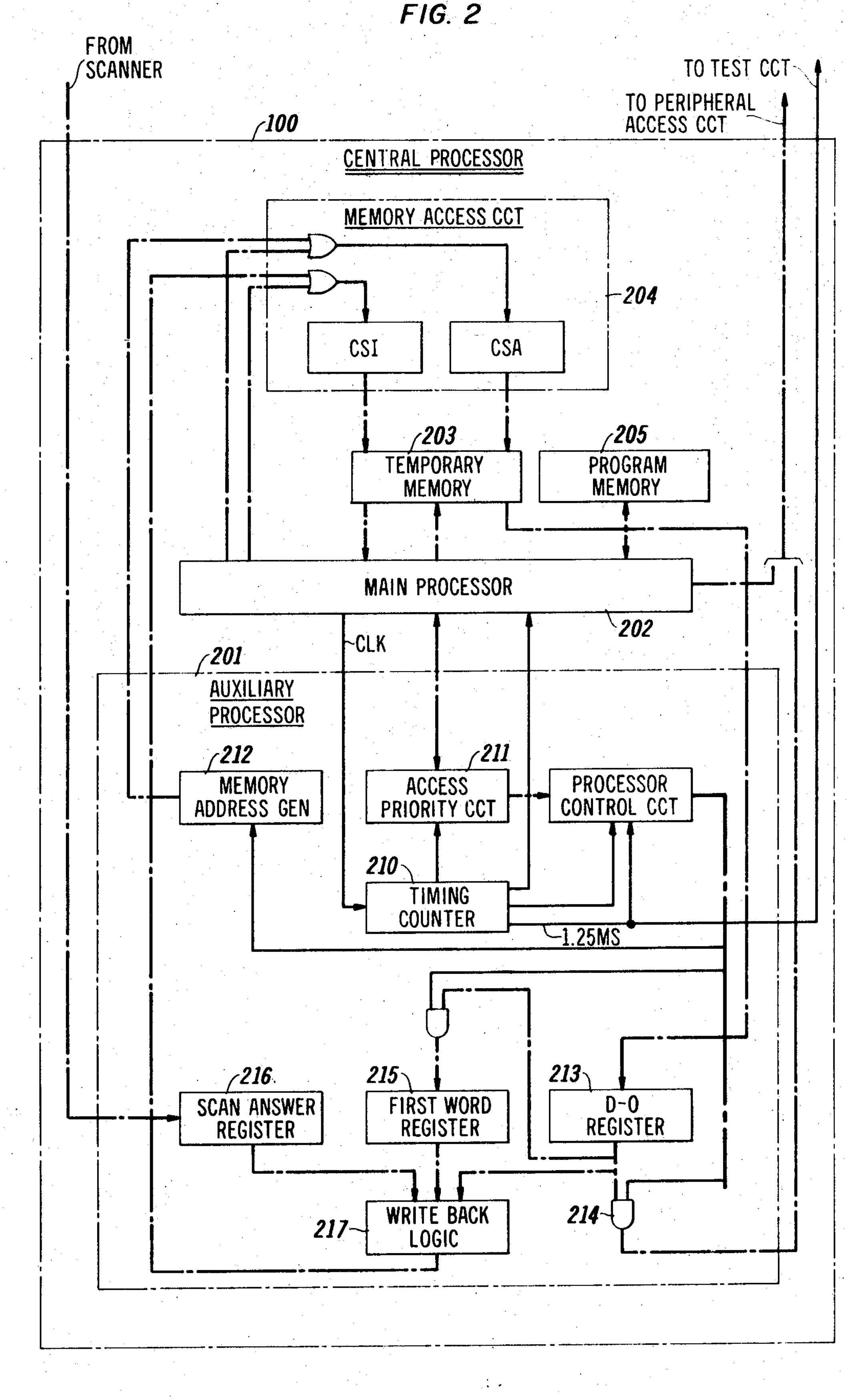
FIG. 2 is a more detailed representation of the central processor of the illustrative embodiment.

The Auxiliary Processor 201, shown in FIG. 2, is a wired logic machine which periodically generates these scanner control signals and transmits them to the Scanner 105 via the Peripheral Access Circuit 110. These scanner control signals are generated in accordance with control information read from designated areas of the Temporary Memory 203 which are referred to herein as originating registers.

The Temporary Memory 203 may be accessed from the Main Processor 202 or the Auxiliary Processor 201 via the Memory Access Circuit 204. The Auxiliary Processor 201 comprises the Access Priority Circuit 211 which resolves access priority conflicts between the main and auxiliary processors. This circuit is arranged to normally give priority to the Main Processor 202 but is responsive to timing signals from the Timing Counter 210 to give priority to the Auxiliary Processor 201 if some or all of the timed work of the auxiliary processor is not completed by a predetermined time. In this manner the Access Priority Circuit 211 assures that the Auxiliary Processor 201 is given sufficient access to the memory to perform all tasks which must be performed within a specified period of time. This circuit is described in greater detail in the above-mentioned copending U.S. application of T. M. Quinn and F. S. Vigilante.

The designated areas of the Temporary Memory 203 which are referred to as originating registers herein, each comprise eight consecutive memory address locations. There are 128 such originating registers in this illustrative system. These registers serve as information transfer buffers between the Auxiliary Processor 201 and the Main Processor 202. The Main Processor 202, under control of a call processing program, writes control information into the first location word of an originating register. The Auxiliary Processor 201 reads the fist word of an originating register and records information in the second word. Subsequently, the second word is read by the Main Processor 202 for use by call processing programs. The Auxiliary Processor 201 initiates servicing 16 of the originating registers approximately once every 1.25 milliseconds in response to a clock pulse which is generated by the Timing Counter 210. Thus, each of the 128 originating registers is serviced approximately once every 10 milliseconds.

The control information written into the first word by the Main Processor 202 comprises scanner address information which identifies the Scanner 105, a scanner row within it and a bit position in the identified scanner row. The Auxiliary Processor 201 accesses a selected originating register by generating the address of the originating register by means of the Memory Address Generator 212, and transmitting it to memory via the Memory Access Circuit 204. When the first word of a selected originating register is obtained from memory, it is stored in the D–O register 213. The scanner address part and the scanner row identification part of the word are transmitted to the Scanner 105 via the Peripheral Access Circuit 110. The portion of the first word which identifies a bit within the scanner row is gated to the First Word Register 215. After the scanner address has been transmitted, the Auxiliary Processor 201 obtains the second word of the selected originating register from the memory and stress this second word in the D-O register 213. The second word contains information concerning the reception of dial pulses. Four bits of the second word contain a count of received dial pulses; one bit serves to indicate whether a new digit has been started; and one bit, the prior-state bit, serves to indicate the prior supervisory state of the output terminals of the associated dial pulse receiver.

The Scanner 105 transmits a scanner answer in response to the scanner address information of the first word transmitted from the D–O register 213. This answer comprises 16 bits representing the states of the output terminals of 16 dial pulse receivers. It is received by the Auxiliary Processor 201 in the Scanner Answer Register 216. The one bit of the 16-bit answer associated with the dial pulse receiver of interest is defined by the contents of the First Word Register 215. This bit is compared in the Write Back Logic 217 with the prior state bit of the second word of the originating register which is now stored in the D–O register 213. If upon comparison of the prior state with the present state it is found that a change from on-hook to off-hook has occurred, the new digit bit in the D–O register is reset to the "0" state and the count in the designated bits of the D–O register 213 is incremented by one. Additionally, the present state of the output of the dial pulse receiver is recorded in the D–O register in place of the prior state information. Thereafter, the contents of the D–O register 213 are written into the second word of the originating register in memory. If the comparison of prior state with the present state does not indicate a change, the contents of the D–O register are returned to memory unmodified. The Auxiliary Processor 201 performs each of the above operations each time an originating register is serviced and dial pulses are to be received.

Dial pulse receiving, when a dial pulse receiver is connected to the Test Circuit 102, is accomplished in the same manner as when a dial pulse receiver is connected to a subscriber circuit. Thus, a record is made in the associated originating register of the number of dial pulses properly received by a receiver being tested by means of the test circuit. As will be mentioned later herein, the recorded number is examined by a test program executed on the Main Processor 202 to determine whether or not a tester receiver is operating properly.

Test Circuit

Figure 3:
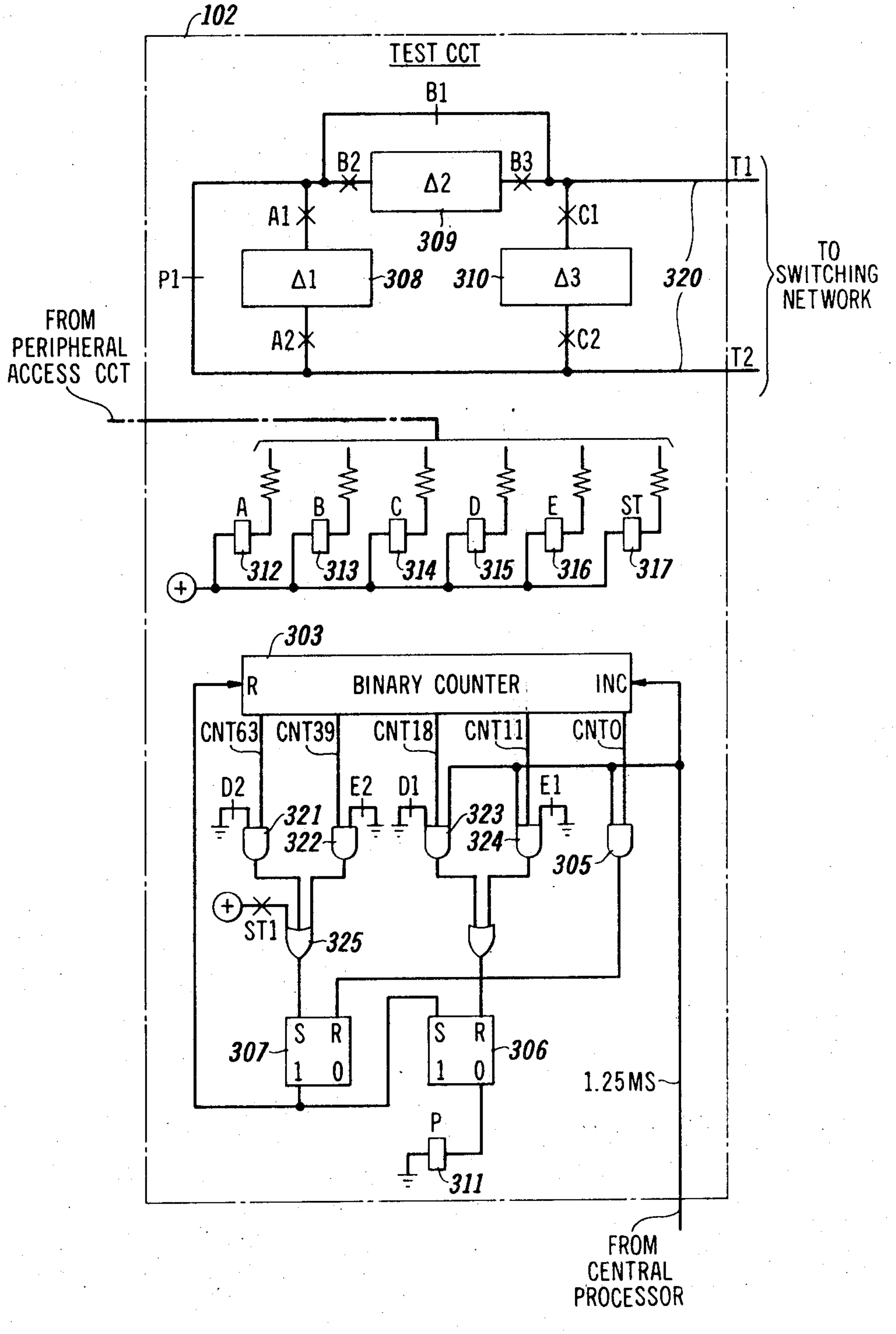
FIG. 3 shows the test circuit of this invention.

The Test Circuit 102 and its operation are described with reference to FIGS. 3 and 4. As mentioned earlier, this circuit may be selectively connected to the dial pulse receivers via the Switching Network 106. The Test Circuit 102 simulates the subscriber line of a dialing subscriber by generating dial pulses which have been distorted by a predetermined amount. Dial pulses are generated in the Test Circuit 102 by operation of the P-relay 311. A normally closed contact P1 of the P-relay is inserted in Conducting Path 320 which is connected to the switching network at terminals T1 and T2. Distortion Elements 308 through 310 are selectively inserted in Conducting Path 320 to introduce a predetermined amount of distortion in the dial pulses generated by operation of the P1 contact. The insertion of the Distortion Elements 308 through 310 into the Conducting Path 320 is controlled by operation of the A-relay 312, B-relay 313, and C-relay 314, respectively. These relays are operated from the Peripheral Access Circuit 110 in accordance with commands transmitted from the Main Processor 202. The distortion elements contain resistive, capacitive, and conductive elements. The Distortion Element 308 represents a short subscriber loop with maximum leakage, and the dial pulse produced by the test circuit when this element is connected to the pulsing path resembles a dial pulse originating from such a short subscriber loop with maximum leakage. Distortion Element 309 represents a long loop with no leakage and the resultant dial pulse produced when this element is used resembles a dial pulse from such a long subscriber loop. Distortion Element 310 represents a subscriber loop having two ringing circuits connected across the line which introduces additional inductive and capacitive elements. A complete test of the dial pulse receivers comprises testing each of the receivers using each of the distortion elements separately.

When a connection has been established from a dial pulse receiver (e.g., 104) to the Test Circuit 102, a potential, derived from the dial pulse receiver, appears across the terminals T/ and T2. Current will flow through the Conducting Path 320 when the P-relay 311 is in the nonoperated state. This current flow and absence of current flow is detected by the dial pulse receiver and is indicated at the output terminals of the receiver. A period of time during which current flows represents the make period of a dial pulse or an interdigital period and a period of time in which no current flows represents the break period of a dial pulse. The duration of the make and break periods of the dial pulses simulated by the Test Circuit 102 is determined by Control flip-FLOPS 306 and 307 which control the operation of the P-relay 311. These control flip-flops are selectively set and reset upon the occurrence of predetermined counts in the Binary Counter 303. This counter may be any known trailing edge binary counter, i.e., a counter which is incremented upon the occurrence of the trailing edge of the increment pulse. The counter is incremented approximately once every 1.25 milliseconds by a timing pulse received from the Timing Counter 210 in the Auxiliary Processor 201. The D-relay 315 and the E-relay 316 are used to selectively apply output signals of the Binary Counter 303 to the Control flip-FLOPS 306 and 307 by means of AND-gates 321 through 324. The Binary Counter 303 is understood to comprise the necessary logic circuitry for generating output pulses on conductors CNT63, CNT39, CNT18, CNT11, and CNT0 when the count in the counter equals 63, 39, 18, 11, and 0, respectively. The D- and E-relays, like the A-, B-, and C-relays, are controlled from the Peripheral Access Circuit 110 in accordance with commands transmitted by the Main Processor 202.

Figure 4A:
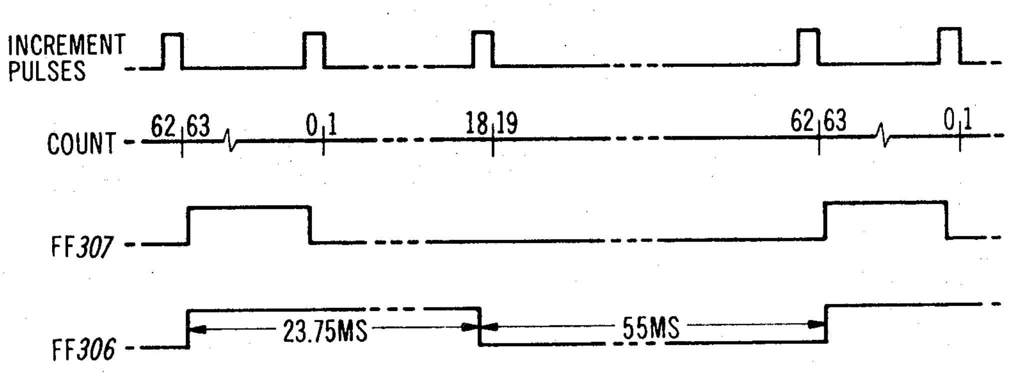
FIGS. 4A and 4B are timing diagrams representing the operation of elements of test circuit.
Figure 4B:
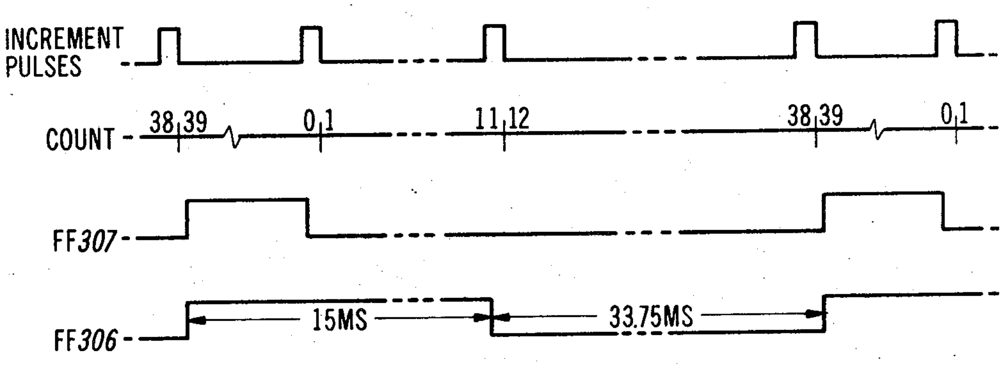

The Test Circuit 102 is designed to generate dial pulses of two different frequencies, namely, 12.7 p.p.s. and 20.5 p.p.s. FIGS. 4A and 4B are timing diagrams showing the operation of the Control flip-flops 306 and 307 in relation to the occurrence of the 1.25 millisecond increment pulses and the count occurring in the Binary Counter 303. The operational state of flip-flop 306 substantially represents the generated dial pulse prior to distortion. FIG. 4A relates to a simulated dial pulse generated at the rate of 12.7 p.p.s. having a 70 percent break period. This rate approximates the 10 p.p.s. which are generally produced by subscriber sets. In this test arrangement a higher rate was chosen to test the dial pulse receivers for the proper reception of dial pulse having a rate slightly greater than 10 p.p.s. The period of each of a train of pulses produced at the rate of approximately 12.7 p.p.s. is 78.75 milliseconds. The 70 percent break period for the simulated dial pulses fields a 23.75 millisecond make period (which equals 19 1.25-millisecond periods) and a 55-millisecond break period (which equals 44 1.25-millisecond periods.)

The duration of the make and break periods is determined by Control flip-flops 306 and 307. The beginning of the make period is determined by the setting of Control flip-flop 307 and the beginning of the break period is determined by the resetting of Control flip-flop 306. The generation of the dial pulses of the 12.7 p.p.s. rate is controlled by operation of the D-relay which has break contacts for enabling AND-gates 321 and 323. An output lead of the Binary Counter 303 labeled CNT63 is connected to AND-gate 321 activating this gate at the occurrence of the count of 63 in the Binary Counter 303. It follows then that flip-flop 307 is set when the count of 63 occurs in the counter and the D-relay is in its operated state. As shown in FIG. 3, the "1" output of flip-flop 307 is connected to the set terminal of flip-flop 306 and the reset terminal of the Binary Counter 303. Consequently, the setting of flip-flop 307 results in the resetting of the counter and the setting of flip-flop 306. Since the coil of the P-relay is directly connected to the "0" output terminal of flip-flop 306, this relay is released as soon as the flip-flop is set. This leads to the closing of the P1 contacts in the Conducting Path 320 and current flow through this path. This is the beginning of the make period of the simulated dial pulse.

In order to release the Binary Counter 303 for further counting, flip-flop 307 must be reset before the next increment time of the counter which occurs at the trailing edge of the next increment pulse. This flip-flop is reset from AND-gate 305 during the first portion of the next succeeding increment pulse after the reset operation. Hence, the reset of the counter is released soon after the occurrence of the leading edge of the reset pulse. The time required for propagation of the reset pulse through AND-gate 305 and flip-flop 307 is understood to be sufficiently short compared with the duration of the increment pulse that the reset to the counter will be released before the trailing edge of the increment pulse occurs. FIG. 4A shows the effect of resetting the counter to "0" at the count of 63. It shows how the counter effectively changes from the count of 63 to the count of 1 upon the application of a single increment pulse and that the counting cycle of the counter is effectively from 1 through 63.

After having been released, the P-relay remains in the released state for 23.75 milliseconds which equals 19 1.25-millisecond periods. When the 23.75-millisecond period has elapsed, the Control flip-flop 306 is reset from AND-gate 323 which, like AND-gate 321, is enabled when the D-relay is in its operated state. The conductor labeled CN18, which is one of the inputs to AND-gate 232, is in the active condition as long as the count in the counter equals 18. The conductor labeled 1.25 msec., which carries the increment pulse, also is one of the inputs to AND-gate 323. Thus, AND-gate 323 is activated just prior to the occurrence of the count of 19 to the counter, to reset flip-flop 306 thereby operating the P-relay. This marks the end of the make period and at the same time marks the beginning of the break period. The P-relay remains in this operated state for 55 milliseconds which equals 44 1.25-millisecond periods.

Upon the subsequent occurrence of the count of 63 in the Binary Counter 303, flip-flop 307 is again set and the make period of a new dial pulse is initiated. Thus, the make period of the dial pulse exists from count 63 to count 19 and the break period exists from count 19 to count 63. The Test Circuit 102 keeps producing such dial pulses as long as the D-relay remains operated.

FIG. 4B relates to the generation of simulated dial pulses at the rate of 20.5 p.p.s., each pulse having a 69.2 percent break. In this case each pulse has a repetition period of 48.75 milliseconds with a make period of 15 milliseconds (which is equal to 12 1.25-millisecond periods) and a break period of 33.75 milliseconds (which is equal to 27 1.25-millisecond periods).

The generation of the 20.5 p.p.s. dial pulses is controlled by operation of the E-relay 316 which has break contacts to enable AND-gate 322 and 324. Output lead CNT39 is activated when the Binary Counter 303 reaches the count of 39 thereby causing the setting of flip-flop 307. Consequently, as described earlier herein, the counter is reset, flip-flop 306 is set, and the P-relay is released. Thus, the occurrence of the count of 39 initiates the make period. Output conductor CNT11 is activated when the count of 11 is reached. AND-gate 324 is activated upon the occurrence of the 12th increment pulse on the conductor labeled 1.25 msec., thereby causing flip-flop 306 to be reset which leads to the operating of the P-relay 311. Thus, the break period is initiated at the count of 12. When the counter again reaches the count of 39, the make period of the next dial pulse is initiated. Thus, the make period of the dial pulse exists from count 39 to count 12 and the break period exists from count 12 to count 39.

To provide an orderly method for starting the test circuit, the ST-relay 317 has been provided. This relay is operated from the Peripheral Access Circuit 110 in the same manner as relays A through E. Operation of the ST-relay causes the make contacts ST1 to be operated thereby applying a set signal to flip-flop 307 via OR-gate 325. As a result, flip-flop 306 is set and the Binary Counter 303 is reset. These circuits remain in these conditions as long as the ST-relay remains operated, and the counter commences counting from the count of "0" when the ST-relay is released.

Test Program

Testing of the dial pulse receivers is controlled by test program sequences stored in the Program Memory 205. The sequences are executed on the Main Processor 202 which is a program controlled processor described in the above-mentioned copending application of T. M. Quinn and R. S. Vigilante. The test program is described herein only generally in terms of the functions to be performed. Implementation of programs to perform such functions on the processor described in the above-mentioned copending application is well within the capabilities of the ordinary person skilled in the art.

The test program sequences, when executed by means of the Main Processor 202, select a dial pulse receiver to be tested and assign an originating register to the dial pulse. The assigned originating register, which comprises certain memory address locations of the Temporary Memory 203, is initialized by the program for use by the Auxiliary Processor 201 for the counting and recording of dial pulses, as described earlier herein. By further execution of the test program sequences, commands are generated for connecting the selected dial pulse receiver to the Test Circuit 102 by means of the Switching Network 106 and for enabling the selected dial pulse receiver. Commands are also generated for the selective operation of relays A through E of the Test Circuit 102 and for releasing the ST-relay in order to initialize the test circuit at a specified time. The functions of the ST-relay and relays A through E have been described previously herein. After a specified period of time has elapsed, the originating register assigned to the dial pulse receiver under test is read under control of the test program and the dial pulse count accumulated by the Auxiliary Processor 201 in the originating register is obtained. A comparison is then made under control of the test program whereby the accumulated count is compared with the number of dial pulses calculated to have been transmitted during that specified period of time. If it is found that the accumulated count does not equal the calculated number, commands are generated for the printing of an error message on Printer 107. If no mismatch is found, the test is repeated for a next selected dial pulse receiver.

It is to be understood that the above-described arrangement is merely illustrative of the application of the principles of the invention; numerous other arrangements may be devised by those skilled in the art without departing from the spirit and scope of the invention.

What is claimed is:

1. A telephone switching system comprising:
clock means for generating timing pulses,
a plurality of dial pulse receiving circuits,
first circuit means responsive to said timing pulses for continuously generating interrogate pulses at a first repetition rate,
a scanning arrangement responsive to said interrogate pulses to interrogate said receiving circuits for the receipt of dial pulses,
second circuit means responsive to said timing pulses for generating simulated dial pulses which advance in time with respect to the occurrence of said interrogate pulses,
means for selectively transmitting said simulated dial pulses to said dial pulse receiving circuits, and
means for determining whether the number of dial pulses received by said selected receiving circuit during a predetermined period of time is equal to the number of simulated dial pulses transmitted to a selected receiving circuit during said predetermined period of time and for generating mismatch signals.

2. A telephone switching system in accordance with claim 1 wherein said second circuit means comprises a plurality of pulse distorting elements,
each of said elements comprising circuits for distorting pulses in a prescribed manner, and
selection means for selectively employing said elements.

3. A telephone switching system comprising:
a dial pulse receiving circuit;
scanning means for interrogating said dial pulse receiving circuit, and for detecting the reception of dial pulses by said circuit;
clock means for generating clock pulses of a predetermined frequency;
said scanning means being responsive to said clock pulses to interrogate said dial pulse receiving circuit approximately once every *n* discrete time periods;
dial pulse generating means responsive to said clock pulses for applying simulated dial pulses to said dial pulse receiving circuit at the rate of approximately one pulse every *m* discrete time periods;